Jan. 22, 1957  I. JEPSON ET AL  2,778,961
FLYWHEEL TYPE MAGNETO
Filed Jan. 8, 1954  2 Sheets-Sheet 2

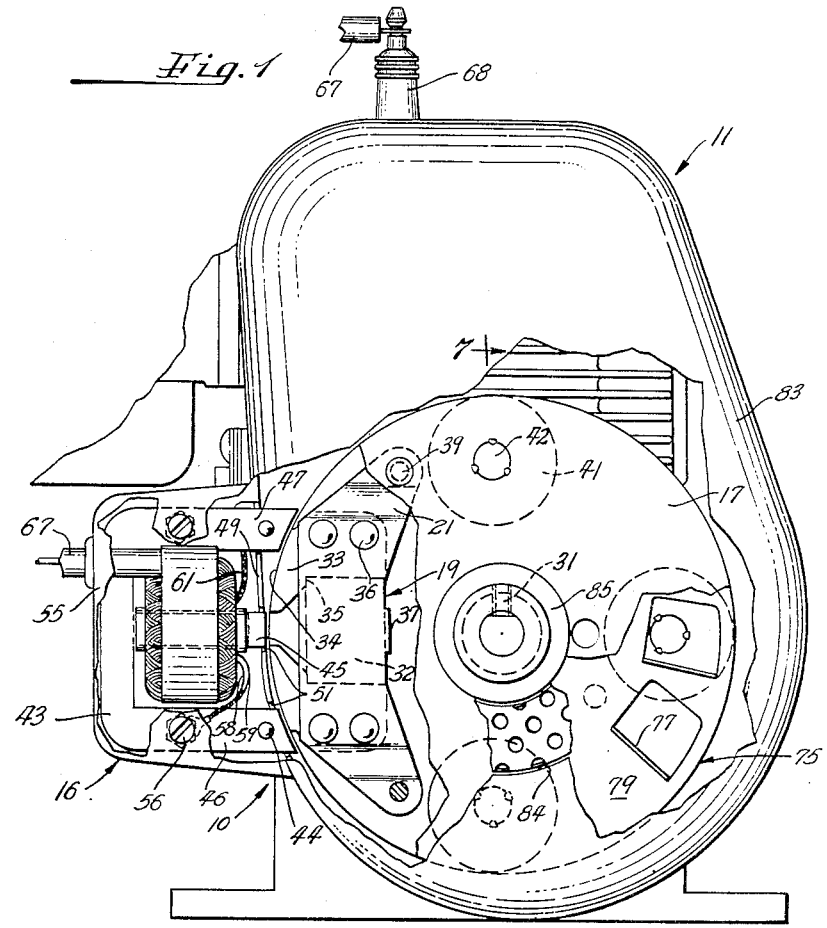

Inventors
Ivar Jepson
Lewis John Craft, Jr.
By McCanna & Morsbach
Attys.

United States Patent Office
2,778,961
Patented Jan. 22, 1957

2,778,961

FLYWHEEL TYPE MAGNETO

Ivar Jepson, Oak Park, and Lewis John Craft, Jr., Elmhurst, Ill., assignors to Sunbeam Corporation, Chicago, Ill., a corporation of Illinois Application January 8, 1954, Serial No. 402,882

11 Claims. (Cl. 310—153)

This invention relates to a magneto and particularly to a magneto of the flywheel type.

Magnetos for internal combustion engines have heretofore been incorporated in the flywheel construction of the engine so as to conserve space and materials and thereby provide a more economical and compact engine construction. In such flywheel magnetos it is desirable to arrange the magneto as an inductor type with the permanent magnet for producing the magnetic field mounted on the flywheel for rotation therewith and the magneto coils mounted on a stationary portion of the engine to thereby eliminate the necessity of providing slip rings or the like for conducting current from the coil, as is necessary when the coil is mounted on the flywheel and the magnet is stationary.

In previous inductor type flywheel magnetos, the permanent magnet has been molded or imbedded in a casting of non-magnetic material forming the main body of the flywheel. Formation of the flywheel from non-magnetic material has been deemed necessary in order to prevent the leakage of flux from the magnet through the flywheel body and, since the flywheel must have adequate flywheel action and yet be compact, the flywheels have usually been formed of a non-magnetic material having a high specific gravity such as brass, zinc or the like, which materials are relatively expensive in comparison to ferromagnetic materials such as iron or steel which have a corresponding specific gravity. The cost of flywheel magnetos formed of non-magnetic material is therefore relatively high.

In conventional inductor type flywheel magnetos, whenever the rotational position of the flywheel is such that the permanent magnet pole pieces are not in registry with the coil winding core, the magnet is subjected to severe demagnetizing effects since the shape and spacing of the magnet pole pieces is such as to provide a relatively high reluctance path for the magnet. In addition, the magnet is not shielded and the latter is therefore subjected to stray magnetic fields which also tend to demagnetize the magnet. These demagnetizing influences acting on the magnet over a prolonged period of time eventually reduce the strength of the magnet to such a low level that the spark produced thereby is not very intense and starting of the engine is difficult if not impossible. Proper engine operation can then be restored only by remagnetizing or replacing the magnet.

It is an important object of this invention to provide a flywheel magneto which is formed of low cost ferromagnetic materials such as iron or steel.

Another object of this invention is to provide a flywheel for an inductor type flywheel magneto of simple construction which may be economically fabricated from stock materials and which is highly efficient for the purposes intended.

Another object of this invention is the provision of a flywheel in which the permanent magnet and the pole pieces therefor are formed into a unitary sub-assembly and then attached to the flywheel thereby facilitating assembly of the flywheel.

Yet another object of this invention is the provision of a flywheel magneto in which the magnet is mounted on the flywheel and the flywheel is constructed and arranged to reduce the demagnetizing effects on the magnet and thereby stabilize the latter. In accordance with this object, the flywheel is constructed of a magnetic material which shields the magnet from stray magnetic fields and also shunts a portion of the magnetic flux from the magnet when the latter is not in registry with the poles of the winding core to thereby reduce the demagnetizing effects on the magnet during those periods in which the magnet is not shunted by the winding core.

Still another object of this invention is the provision of a flywheel magneto including a flywheel formed of magnetic material and having a permanent magnet mounted thereon in such a manner that the magnetic material in the flywheel does not form a part of the magnetic circuit when the magnet pole pieces are in registry with the poles of the winding core, and in which the magnetic material in the flywheel shunts a portion of the flux from the magnet when the magnet pole pieces are not in registry with the core to thereby reduce the demagnetizing effects on the magnet and increase the useful life thereof.

These, together with various ancillary objects and advantages of this invention will be more readily appreciated as the same becomes more better understood by reference to the following detailed description when taken in connection with the accompanying drawings wherein:

Figure 1 is a fragmentary side elevational view of an internal combustion engine incorporating the flywheel type magneto of the present invention, parts being broken away to illustrate details of construction;

Fig. 2 is a fragmentary sectional view through the cam shaft and circuit breaker housing on the internal combustion engine illustrating the construction of the circuit breaker;

Figs. 3 and 4 are fragmentary diagrammatic views showing the flywheel in different rotational positions thereof;

Figure 5:
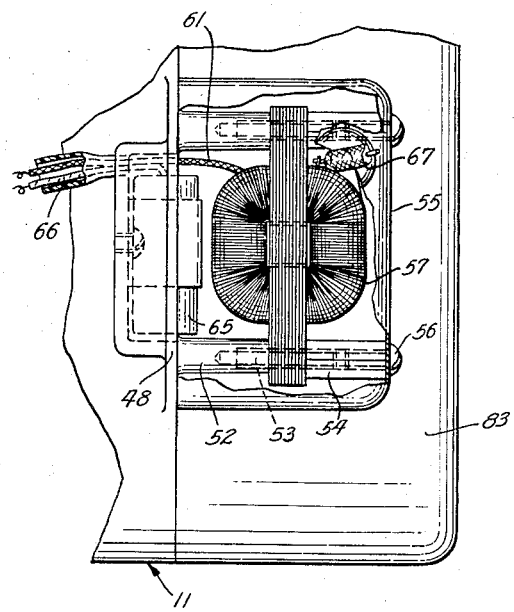
Fig. 5 is a fragmentary side elevational view of the internal combustion engine showing the core and core mounted thereon.
Figure 6:
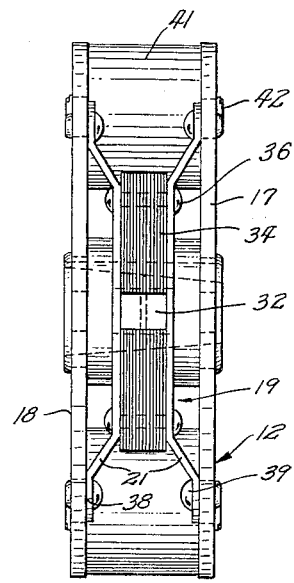
Fig. 6 is a side elevational view of the flywheel.

Reference is now made more specifically to the accompanying drawings wherein the flywheel type magneto, indicated generally by the numeral 10 is shown mounted on the internal combustion engine 11. As is conventional, the flywheel 12 is attached to a shaft driven by the engine which in the present invention comprises the projecting end 13 of the crank shaft 14. As shown, the crank shaft is journaled in an end wall 15 of the engine crank case, which end wall is advantageously formed in a manner described more fully hereinafter to provide a support for the core and coil assembly 16.

Figure 7:
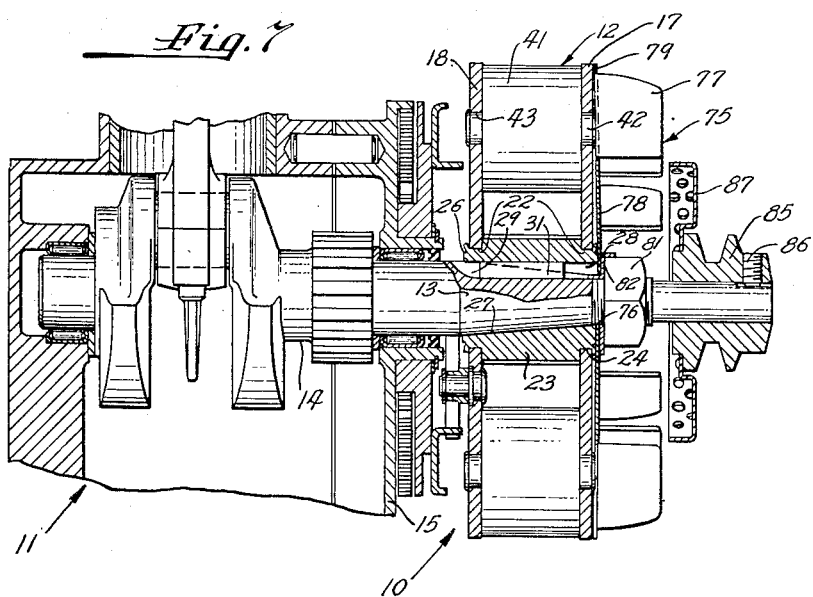
Fig. 7 is a fragmentary vertical sectional view through the internal combustion engine crank case and flywheel.

In accordance with the present invention, the flywheel is formed of a pair of spaced walls or plates 17 and 18 of magnetic material such as iron or steel, and the permanent magnet and pole piece assembly 19 is mounted between the plates by means of mounting brackets 21 of non-magnetic material. As best shown in Fig. 7, the plates 17 and 18 are in the form of identical circular disks which may conveniently be stamped from flat stock, which disks have central apertures 22 formed therein. A cylindrical hub 23 is formed with reduced end portions 24 which extend through the apertures 22, and the plates are rigidly secured to the hub as by riveting or staking the hub thereto as indicated at 26. In the construction illustrated, the hub 23 is provided with a tapered bore 27 for the reception of the correspondingly tapered end portion 13 of the crank shaft 14. The hub 23 and the end 13 of the crank shaft are provided with keyways 28 and 29 respectively whereby the flywheel is non-rotatably attached to the cam shaft when the key 31 is inserted in the keyways.

The permanent magnet and pole piece assembly 19 comprises a relatively short bar 32 of permanent magnetic material having a high coercive force, and pole pieces 33 of laminated sheet steel. The pole pieces are L-shaped, as best shown in Fig. 1, and have arcuate pole faces 34. The pole piece laminations are shaped to provide a shoulder 35 which extends perpendicular to the face thereof that abuts the ends of the bar magnet, which shoulder is adapted to engage the edge of the bar 32 and properly position the same relative to the pole pieces. The magnet and pole pieces are preformed as a unitary subassembly and then mounted on the flywheel. In assembling the magnet and pole pieces, the ends of the bar 32 are ground flat and the pole piece laminations clamped thereto. The mounting brackets 21 disposed on opposite sides of the pole piece laminations are riveted thereto by rivets 36 and thereby retain the pole pieces pressed against the ends of the bar magnet, the mounting brackets extending along the sides of the magnet to retain the latter in position therebetween. Integral tongues 37 are formed on the mounting brackets 21 and engage one side of the bar to retain the magnet against the shoulder 35. The ends of the mounting brackets 21 are angularly offset as at 38 and secured to the plates 17 and 18 by rivets 39. The mounting brackets, which are formed of non-magnetic material such as brass, maintain the magnet and pole pieces in spaced relation to the plates of the flywheel to limit the shunting effect of the plates. In practice, the plates are spaced about ⅜ of an inch from each side of the magnet and with this spacing, the flux from the magnet that is shunted by the plates is approximately ten percent of the total flux of the magnet.

The weight of the magnet and pole pieces on the flywheel is counterbalanced by a plurality of weights, here shown three in number. The weights 41 may conveniently be formed of bar stock and preferably have integral projections 42 on opposite ends thereof which extend through corresponding apertures 43 in the plates 17 and 18. The projections are staked or riveted to the plates and, in conjunction with the hub 23 serve to retain the plates in predetermined spaced relation. For accurate balance, the weights or the plates may be drilled at appropriate points after assembly of the flywheel.

The core assembly 16 includes an E-shaped core 43 (see Fig. 1) formed of sheet steel laminations secured together by rivets 44 and having a central leg 45 and a pair of outer legs 46 and 47. The poles of the core are arcuate and formed complementary to the periphery of the flywheel and the core is mounted on a stationary portion of the engine with the poles thereof spaced by a running clearance from the periphery of the flywheel. As is best shown in Fig. 5, the end wall 15 of the crank case is provided with a laterally projecting plate 48 which forms one wall of the casing for the coil, the end wall 15 also having a baffle 49 (see Fig. 1) formed integrally therewith and extending perpendicular thereto, which baffle has apertures 51 formed therein through which the legs of the core extend. A pair of bosses 52 are formed integrally with the laterally projecting plate 48 and extend perpendicular thereto, which bosses have internally threaded ends for the reception of threaded pins 53. The pins 53 extend through apertures in the legs 46 and 47 of the core and the core is secured to the bosses by means of the internally threaded sleeves 54. The apertures in the legs of the cores are enlarged so as to provide for adjustment of the position of the core thereon and thereby permit accurate adjustment of the air gap between the pole faces 34 on the pole pieces 33 and the ends of the legs of the core which air gap is adjusted for a running clearance of .020 to .030 inch. A casing 55 is attached to the sleeves 54, as by bolts 56, which casing together with the laterally projecting plate 48 and the baffle 49 substantially completely encloses the coil and core.

The magneto of the present invention is a high tension type and has a primary and secondary coil, of conventional construction, disposed on the central leg 45 of the core and indicated generally by the numeral 57. One side of each of the primary and secondary coils is grounded through conductors 58 and 59 and the other side of the primary is connected through conductor 61 to the insulated terminal 62 on the circuit breaker 63 (see Fig. 2). The fixed terminal 64 of the circuit breaker is connected to ground and a condenser 65 (Fig. 5) having one side (such as the casing thereof) grounded is connected through conductor 66 to the insulated terminal 62 on the circuit breaker, in parallel with the breaker points and the primary coil. The other side of the secondary coil is connected through insulated lead 67 to the spark plug 68.

The circuit breaker 63 comprises a fixed contact 69 electrically connected to the grounded terminal 64 and adjustably mounted as by screws 71 to the engine frame. The insulated movable contact 68 is electrically connected to the insulated terminal 62 and is yieldably urged into engagement with the fixed contact. As is conventional, the movable contact is moved between its open and closed positions in timed relation with the rotation of the engine. As illustrated in the drawings, the circuit breaker is operated by the cam 72 on the engine cam shaft 73, a slidably mounted pusher pin 74 being provided to operate the movable contact arm. This construction provides rapid separation of the contact points and minimizes arcing thereacross as the latter are being opened.

A fan 75 is mounted on the front end of the flywheel to cool the engine and particularly the cylinder walls thereof to maintain proper operating temperature. The fan 75 is advantageously formed of a flat disk and is provided with a central aperture 76 for the reception of the end of the crank shaft 13. A plurality of blades 77 are stuck from the disk and spaced radially from the center to provide a central portion 78, the blades also being spaced inwardly from the periphery of the disk to provide an integral rim 79 which extends about the periphery of the disk. As best shown in Fig. 7, the disk is dished slightly so that the central portion thereof abuts the end of the hub 23 and the rim 79 abuts the face of the plate 17. The circumferential spacing of the blades about the disks is preferably made uniform and is selected so that the openings formed by the blades register with the projecting ends of the rivets 39 which are provided to attach the magnet and pole piece assembly 19 to the flywheel, the openings also registering with the projecting ends 42 of the weights 41 so that the rim 79 may abut the face of the plate. The fan 75 is attached to the shaft by the nut 81 which also secures the flywheel to the crank shaft, a lock washer 82 being provided for obvious reasons. In this manner, the flywheel forms a back wall for the fan 75 and serves to deliver the air stream outwardly to be directed by the fan shroud 83 against the cylinder walls.

The fan shroud (see Fig. 1) is disposed about the periphery of the flywheel and the fan 75, and extends upwardly along the cylinder walls of the engine, the shroud having a central opening 84 through which the cooling air enters. A power takeoff pulley 85 is non-rotatably attached to the projecting end of the crank shaft 13 by a set screw 86 and an annular skirt 87 is secured to the pulley and overlies the opening 84 in the shroud to prevent entrance of foreign matter into the blower.

From the foregoing, it is deemed apparent that the flywheel magneto may be economically manufactured since it utilizes low cost materials such as iron or steel and further the construction is such that the flywheel may be formed in an economical manner on punch presses and automatic screw machines and does not require expensive forming or casting operations as is the conventional manner of forming flywheel magnetos. Because of the high specific gravity of the iron and steel, the volume of material which must be used in the flywheel to provide adequate flywheel action may be small and hence the flywheel itself may be relatively compact.

The flywheel construction wherein the permanent magnet and pole pieces are disposed between a pair of ferromagnetic plates and spaced therefrom has certain functional advantages, in addition to the advantages of structural simplicity and economy. As shown in Fig. 1, the adjacent ends of the pole pieces 33 are spaced apart a distance substantially equal to the width of the center leg 45 of the core. However, the small area of the ends of the pole pieces greatly increases the flux density at the pole piece tips when the magnet and pole piece assembly is remote from the core 43 so that the reluctance of the path across this gap is high. The magnet would therefore normally be subjected to severe demagnetizing effects when the magnet and pole piece assembly is not shunted by the E-core. The ferromagnetic plates or walls 17 and 18 are also spaced from the magnet a distance substantially equal to the spacing between the adjacent ends of the pole pieces 33. However, because of the large area of the plates, the latter shunt a portion of the magnetic flux of the magnet when the latter is not aligned with the core so that the plates reduce the total reluctance of the magnetic circuit for the magnet and thereby reduce the demagnetizing effects on the magnet and prolong the useful life thereof. Additionally, the magnetic plates shield the magnet from stray magnet fields which also tends to demagnetize the magnet. Therefore, the flywheel construction wherein the magnetic plates are disposed on opposite sides of the magnet functions to prevent demagnetizing of the magnet and prolongs the life of the magnet. The demagnetizing effects on the magnet could be further reduced by positioning the plates of the flywheel relatively closer to the magnet. However, it is necessary to maintain the reluctance of the magnetic path through the plates high as compared to the reluctance of the magnetic path through the pole pieces and winding core when the pole pieces are in registry therewith so that the shunting effect of the plates under these conditions is small. In practice, a spacing of at least 5/16 of an inch between the magnet and plates 17 and 18 is necessary.

It has additionally been noted that the flywheel construction utilizing magnetic plates on opposite sides of the magnet provides improved starting of the engine due to the production of a higher energy spark. This has been attributed to the fact that a portion of the flux which is normally shunted by the flywheel plates, when the pole pieces are remote from the core, is diverted from the plates when the pole pieces are aligned with the core at which time the core provides a lower reluctance magnetic path for the magnet flux. This produces a more rapid rate of change of flux as the pole pieces move past the ends of the legs of the core which in turn induces a higher voltage in the coil.

It is considered that this will be better understood by a brief description of the mode of operation of the high tension type flywheel magneto. As the magnet and pole pieces revolve with the flywheel, the pole pieces sweep past the ends of the E-core once during each revolution. The flux in the center leg of the core first builds up in one direction to a maximum when the leading pole piece is aligned with the end of the center leg 45 and the trailing pole piece is aligned with the outer leg 47. As the flywheel rotates, the flux through the center leg decreases to zero when the flywheel is in a position such that the adjacent ends of the pole pieces straddle the center leg 45, as shown in Fig. 1. Further rotation of the flywheel causes the flux in the center leg to increase in the opposite direction to a maximum when the trailing pole piece is aligned with the center piece and the leading pole piece is aligned with the outer leg 46 of the core. Further rotation decreases the flux in the center leg to zero as the pole pieces move out of registry with the core legs.

In a high tension magneto the voltage applied to the spark plug includes two components. One component, hereinafter referred to as the generated voltage, is produced by the movement of the magnet and pole pieces past the ends of the legs of the core and is proportional to the number of turns in the secondary winding and the rate of change of flux in the center leg of the core produced by movement of the magnet pole pieces thereby. The other component, hereinafter referred to as the induced voltage, is produced by open circuiting the primary at a time when a high current is flowing therethrough so that there is a rapid decay in the current flowing through the primary. The primary current produces a flux in the center leg of the core which decreases rapidly when the primary current is interrupted thereby inducing a high voltage in the secondary. The voltage induced in the secondary upon opening of the primary circuit is a high amplitude, short duration pulse which functions to ionize the gas mixture between the spark electrodes but is of itself insufficient to ignite the mixture. The generated component of the voltage in the secondary alone is insufficient to break down the resistance of the gap in the spark plug, but once the resistance is broken down due to the collapsing field of the primary current, the generated voltage in the secondary sustains the current across the gap and produces a long duration flame.

The condenser 65 absorbs the induced charges in the primary winding to prevent the discharge of this current across the breaker points when the circuit is broken. The charge on the condenser surges back into the primary winding in the opposite direction causing a more rapid demagnetization of the center leg 45 and producing a higher voltage than would otherwise be obtained.

In order to obtain proper phase relation between the primary current and the secondary generated voltage so that open circuiting of the primary will induce a voltage in the secondary which is additive with respect to the generated voltage in the secondary, the contact points are opened when the magnet pole pieces are arranged as shown in Fig. 4, approximately 7° 30′ from the position of the flywheel shown in Fig. 1 in which the pole pieces are disposed symmetrically of the center leg. As the flywheel moves in the direction indicated by the arrows in Fig. 4 from the position shown in Fig. 1 to the position shown in Fig. 4, the flux in the center leg builds up in the direction indicated by the arrows on the E-core which is the reverse of the direction of flux build up shown in Fig. 3.

The ferromagnetic plates 17 and 18 disposed on opposite sides of the magnet pole pieces are spaced therefrom by an air gap which is large as compared to the air gap between the pole pieces and the core when the pole pieces are aligned therewith. When the flywheel is in the position shown in Fig. 1 with the pole pieces disposed on opposite sides of the core, the flux of the center leg is zero and, because the flux can only pass between the tips of the pole pieces and the corners of the center leg of the core, the latter provides a relatively high reluctance path. Under these conditions, a portion of the magnet flux will be shunted by the plates 17 and 18. As the flywheel moves in the direction indicated by the arrows in Figs. 3 and 4, the reluctance of the magnetic path from the pole pieces through the center leg 45 and outer leg 46 is decreased so that the core provides a relatively low reluctance path. Under these conditions, the shunting effect of the plates is negligible. Hence, proportionately less flux is shunted by the plates as the flywheel moves from the position shown in Fig. 1 to the position shown in Fig. 4. This diverting of the flux which was shunted by the plates to the core 43 increases the rate of change of flux in the center leg over that which would occur if no flux were shunted, and consequently this produces a higher generated voltage in the secondary. This diverting of the flux from the plates to the core is considered to be a major contributing factor in the observed increase in the secondary generated voltage, which in turn has produced a higher energy spark at the gap on the spark plug.

The rate of change of flux during the aforementioned interval has also been enhanced by the design of the pole pieces to produce a more rapid change of flux. As shown in the drawings, the pole pieces are designed so that when the trailing edge of the leading pole piece is aligned with the edge of the center leg 45 of the core adjacent the leg 46, the leading edge of the pole piece covers about one-half of the arcuate end of the leg 46. Thus, as the flywheel rotates from the position shown in Fig. 1 and the leading portion of the trailing pole piece begins to move across the end of the center leg, a rapid build up of flux occurs in the center leg since the leading portion of the leading pole piece overlies a substantial portion of the end of the leg 46 and thus provides a low reluctance path. In this manner, the rate of change of flux during movement of the flywheel from the position shown in Fig. 1 to the position shown in Fig. 4 is greatly increased, and this in turn increases the generated voltage of the secondary.

It is also to be noted that the core and coil are located externally of the flywheel and are consequently readily accessible for adjustment or replacement without having to remove the flywheel. Similarly, the circuit breaker 69 is also located externally of the flywheel assembly so that adjustment thereof may be easily effected.

While there has been shown and described a particular embodiment of the present invention, it will be understood that various changes and modifications may obviously be made by those skilled in the art without departing from the invention in its broader aspects, and it is intended in the appended claims to cover all such changes and modifications as fall within the true spirit and scope of the present invention.

We claim:

1. In an inductor type flywheel magneto assembly, a flywheel containing a magnetic material, a stationary winding core having its poles lying adjacent the outer periphery of the flywheel, a permanent magnet having pole pieces, non-magnetic means mounting said magnet and pole pieces on said flywheel with the faces of the pole pieces facing the exterior periphery of the flywheel, said flywheel having portions of magnetic material extending on opposite sides of said magnet and pole pieces and spaced therefrom and from portions of said non-magnetic means by a distance which is large as compared to the spacing of the winding core poles from the periphery of the flywheel whereby the shunting effect of the flywheel is small when the magnet pole pieces are in registry with the poles of the winding core.

2. In an inductor type flywheel magneto assembly, a flywheel containing a magnetic material, a stationary winding core having its poles lying adjacent the outer periphery of the flywheel and spaced closely adjacent thereto, a relatively short bar of permanent magnet material having high coercive force, pole pieces positioned on the ends of said bar and having arcuate pole faces, brackets of non-magnetic material secured to said pole pieces and overlying opposite sides of said bar to secure said pole pieces thereto, means attaching said brackets to said flywheel with the faces of the pole pieces facing the exterior periphery of the flywheel, said flywheel having portions of magnetic material extending on opposite sides of said bar and spaced therefrom and from portions of said bracket by a distance which is large as compared to the spacing of the winding core poles from the periphery of the flywheel whereby the shunting effect of the flywheel is small when the magnet pole pieces are in registry with the poles of the winding core.

3. In a flywheel type magneto assembly, a flywheel comprising a pair of spaced plates of magnetic material each having central apertures, a hub secured to said plates adjacent said central apertures to define a rotatable flywheel of the type whereby said hub may be secured to a rotatable shaft, a permanent magnet having pole pieces, non-magnetic means mounting said magnet and pole pieces between said plates in spaced relation thereto with the faces of the pole pieces facing the exterior periphery of the flywheel, a stationary winding core having its poles lying adjacent the periphery of the flywheel, said magnet and pole pieces being spaced from said plates a distance which is large as compared to the spacing of the poles of the winding core from the periphery of the flywheel whereby the shunting effect of the plates is small when the magnet pole pieces are in registry with the poles of the winding core.

4. The combination of claim 3 including a plurality of separate weights disposed between said plates and secured thereto, said weights being circumferentially spaced from said magnet and said pole pieces to provide a dynamically balanced flywheel.

5. In a flywheel type magneto assembly, a flywheel comprising a pair of spaced plates of magnetic material, a relatively short bar of permanent magnet material having a high coercive force, a pair of substantially L-shaped pole pieces each having one leg thereof abutting the end of the bar and the other legs extending towards each other, brackets of non-magnetic material secured to said pole pieces and overlying opposite sides of said bar to secure said pole pieces thereto, means attaching said brackets between said plates with the faces of the pole pieces facing the exterior periphery of the flywheel and with the portions of said brackets secured to said pole pieces being spaced from said plates, and a stationary winding core having its poles lying concentric with the periphery of the flywheel and spaced closely adjacent thereto, said brackets supporting said magnet in spaced relation to said plates to limit the shunting effect of said plates.

6. In an inductor type flywheel magneto, a flywheel comprising a pair of plates, means for attaching each of said plates to a hub for securing said flywheel to a shaft, a permanent magnet having pole pieces, means mounting said magnet and pole pieces between said plates with the faces of the pole pieces facing the exterior periphery of the flywheel, and a plurality of separate weights secured to said plates and disposed therebetween to maintain said plates in spaced relation, said weights being circumferentially spaced to counterbalance the magnet and pole pieces.

7. In an inductor type flywheel magneto, a flywheel comprising a pair of plates each having central apertures, a hub having reduced end portions extending through said apertures and secured to said plates, a permanent magnet having pole pieces, means mounting said magnet and pole pieces between said plates with the faces of the pole pieces facing the exterior periphery of the flywheel, and a plurality of separate weights secured to said plates and disposed therebetween to maintain said plates in spaced relation, said weights being circumferentially spaced between said plates to provide a substantially balanced flywheel.

8. In an inductor type flywheel magneto, a flywheel comprising a pair of plates each having a central aperture, a hub having reduced end portions extending through said apertures and secured to said plates, a relatively short bar of permanent magnet material having a high coercive force, pole pieces on opposite ends of said bar, mounting brackets attached to said pole pieces and overlying opposite sides of said bar to retain the latter therebetween, means attaching said brackets between said plates, and a plurality of separate weights secured between said plates and counterbalancing said magnet and pole pieces.

9. The combination of claim 8 wherein said plates are of magnetic material, said mounting brackets being of non-magnetic material and supporting said magnet in spaced relation to said plates to limit the shunting effect of said plates.

10. In an inductor type flywheel magneto, a flywheel comprising a pair of plates each having a central aperture and a plurality of radially spaced apertures, a hub having reduced end portions extending through said central apertures and staked to said plates, a magnet having pole pieces mounted between said plates with the faces of the pole pieces facing the exterior periphery of the flywheel, and a plurality of weights disposed between said plates having projecting end portions extending through said radially spaced apertures and riveted to said plates to counterbalance said magnet and pole pieces.

11. In an inductor type flywheel magneto, a flywheel comprising a pair of plates each having a central aperture and a plurality of radially spaced apertures, a hub having reduced end portions extending through said central apertures and staked to said plates, a magnet having pole pieces mounted between said plates with the faces of the pole pieces facing the exterior periphery of the flywheel, a plurality of weights disposed between said plates having projecting end portions extending through said radially spaced apertures and riveted to said plates to counterbalance said magnet and pole pieces, a fan comprising a disk having a plurality of fan blades stuck upwardly therefrom and providing a plurality of openings in said disk, said openings being arranged to register with the projecting end portions of the weights and means attaching said disk to said flywheel whereby the disk abuts one of the plates thereof and the end portions of said weights extend into said openings in the disk.

References Cited in the file of this patent

UNITED STATES PATENTS

| | | |
|---|---|---|
| 1,056,360 | Podlesak | Mar. 18, 1913 |
| 1,073,020 | Beck | Sept. 9, 1913 |
| 2,446,761 | Harmon | Aug. 10, 1948 |
| 2,472,313 | Phelon | June 7, 1949 |